United States Patent
Ploechinger

(10) Patent No.: US 6,722,199 B2
(45) Date of Patent: Apr. 20, 2004

(54) SENSOR FOR DETECTING A ROTATIONAL MOVEMENT OR AN ANGULAR ACCELERATION

(76) Inventor: Heinz Ploechinger, Hinding 68, 4785 Freinberg (AT)

(*) Notice: Subject to any disclaimer, the term of this patent is extended or adjusted under 35 U.S.C. 154(b) by 117 days.

(21) Appl. No.: 10/168,280

(22) PCT Filed: Dec. 20, 2000

(86) PCT No.: PCT/EP00/13048
§ 371 (c)(1),
(2), (4) Date: Jun. 13, 2002

(87) PCT Pub. No.: WO01/46701
PCT Pub. Date: Jun. 28, 2001

(65) Prior Publication Data
US 2002/0189349 A1 Dec. 19, 2002

(30) Foreign Application Priority Data
Dec. 20, 1999 (DE) .......................................... 199 61 454
Dec. 23, 1999 (EP) .......................................... 991258146

(51) Int. Cl.$^7$ .............................................. G01P 15/08
(52) U.S. Cl. .................................. 73/514.09; 33/366.15
(58) Field of Search ......................... 73/514.09, 514.05; 33/365, 366.11, 366.12, 366.15

(56) References Cited

U.S. PATENT DOCUMENTS

| | | | |
|---|---|---|---|
| 4,020,700 A | 5/1977 | Lopiccolo et al. ............ | 73/516 |
| 4,232,553 A | 11/1980 | Benedetto et al. ............ | 73/516 |
| 4,361,054 A | 11/1982 | Bailey ........................... | 74/5.6 |
| 4,531,300 A * | 7/1985 | Heidel et al. .................. | 33/366 |
| 5,133,417 A * | 7/1992 | Rider ............................ | 175/45 |
| 5,581,034 A * | 12/1996 | Dao et al. .................. | 73/514.09 |
| 5,780,738 A | 7/1998 | Saunders ................. | 73/504.06 |
| 5,808,197 A * | 9/1998 | Dao .......................... | 73/514.09 |
| 5,835,077 A * | 11/1998 | Dao et al. ................... | 345/157 |

FOREIGN PATENT DOCUMENTS

| | | | |
|---|---|---|---|
| DE | 42 43 978 | 12/1992 | ............ G01C/9/00 |
| EP | 328 247 | 1/1992 | ............. G01P/3/26 |
| EP | 786 645 | 7/1997 | ........... G01C/19/56 |
| EP | 664 456 | 7/1999 | ........... G01P/15/12 |

OTHER PUBLICATIONS

XP 000327137 Sensor of the Yaw Acceleration Rate. Dec. 1992, No. 344.

* cited by examiner

Primary Examiner—Richard A. Moller

(57) ABSTRACT

A sensor for detecting a rotational movement or an angular acceleration has at least one heating element and at least one sensor element and a fluid surrounding the heating element and the sensor element, the heating element producing in the fluid a convection flow zone through which an isothermal field is defined. The heating element and the sensor element are arranged with respect to an axis of rotation of the rotational movement or of the angular acceleration to be detected, in such a way that the sensor element is displaced relative to the isothermal field when a rotational movement or an angular acceleration takes place.

18 Claims, 14 Drawing Sheets

SENSOR FOR DETECTING A ROTATIONAL MOVEMENT OR AN ANGULAR ACCELERATION

BACKGROUND OF THE INVENTION

1. Field of the Invention

The present invention relates to a sensor for detecting a rotational movement or an angular acceleration, and in particular to a sensor for detecting a rotational movement or an angular acceleration which comprises a heating element and a sensor element.

2. Description of the Prior Art

DE 42 43 978 C1 describes a tilt and acceleration sensor comprising in a closed, fluid-filled housing a sensor structure which includes at least two temperature-dependent electric resistors, at least one of the resistors being heated. The convective flow occurring in a gravity or inertia field in the fluid within the housing is evaluated and the signals, which are detected by the sensor, are directly related to the tilt angle and to the acceleration of the sensor system.

EP 95 300 345.6 describes a sensor including at least one temperature-detecting resistance means which is arranged in the interior of a closed space. A gas contained in the closed space is heated and, when a acceleration acts on the sensor, the resistance of the resistance means changes due to the flow of the heated gas across the resistance means. The sensor comprises a semiconductor or an insulating substrate having a cavity provided therein, and a projecting means made of an insulating material and extending in the space at least partially transversely to the cavity, the resistance means being formed integrally with the projecting means.

U.S. Pat. No. 4,361,054 describes an arrangement of hot-wire air velocity meters which are partly installed in a rotor boundary layer so that they form two resistors of a Wheatstone bridge circuit for each axis. The hot-wire resistors change their resistance values in accordance with the angular displacement of the gyrorotor relative to zero. The combination of the resistance changes is then used in the bridge circuit so as to provide an electric signal which is directly proportional to an angular displacement of the gyrorotor.

U.S. Pat. No. 4,020,700 describes a rotary speed sensor which samples by means of hot-wire probes a fluid flow produced by a pump. The nozzle of the rotary speed sensor, which directs a fluid towards a pair of temperature-dependent detection resistance elements, is formed in a main block defining a chamber in which also the detection elements are provided, whereby problems of aligning the jet with respect to the chamber and problems of aligning the detection elements with respect to the nozzle are reduced.

U.S. Pat. No. 5,780,738 describes a device for detecting a rotary speed rate which comprises a body defining a surface with a projecting portion and an opening through the surface, the opening being located in the vicinity of the projecting portion and a fluid flow being directed through this opening along an initial flow axis. The projecting portion orients the fluid flow into a path along the surface in accordance with the Coanda effect. A first flow sensor is secured in position relative to the body and in the vicinity of the path of the fluid flow along the surface of the body. The first flow sensor produces a first indication of a flow rate of a first section of the fluid flow in the vicinity thereof. A second flow sensor is secured in position relative to the body and in the vicinity of the path of the fluid flow along the surface of the body. The second flow sensor produces a second indication of a flow rate of a second section of the fluid flow in the vicinity thereof. The rotary movement of the body is detected in dependence upon the first indication and the second indication.

EP 0 328 247 B1 describes an angular velocity sensor producing an output signal when there is a difference between the output signals of a pair of heat sensors in cases in which, due to the influence of a movement imparted to the gas stream and having the angular velocity to be determined impressed thereon, the gas stream discharged from a gas nozzle sweeps over one of the heat sensors more strongly than over the other.

EP 0 786 645 A2 describes a sensor for detecting a rotary speed rate or an angular acceleration with the aid of a capacitive evaluation of from 2 to 4 moving, i.e. vibrating mass paddles, the sensor being implemented in microsystem technology. The sensor for detecting the rotary speed rate or the angular acceleration includes a vibrator comprising at least two vibrating masses and beams for supporting these masses. The vibrator is formed making use of a monocrystal silicon substrate of the (110)-crystal plane, and the two beams use as main planes two kinds of (111)-crystal planes, which are perpendicular to the silicon substrate and which do not extend parallel to one another; the two beams are flexible in a direction which is parallel to the silicon substrate and vertical to each of the (111)-crystal planes. Capacitance changes between the masses and a group of electrodes are detected.

In addition, rotary speed sensors are known in the case of which the capacitive change of moving masses relative to a fixed mass is evaluated for the purpose of determining the rotary speed.

One disadvantage of known methods and sensors for detecting a rotational movement or an angular acceleration is that these methods and sensors use e.g. moving masses which necessitate the use of a sensitive suspension.

A further disadvantage of known methods and sensors for detecting a rotational movement or an angular acceleration is that these sensors require a complicated structural design which entails a high expenditure and high costs.

Another disadvantage of known methods and sensors for detecting a rotational movement or an angular acceleration is that, e.g. in the case of sensors for detecting a fluid flow, it will be necessary to use devices for producing a fluid flow, such as a pump, so that the fluid flow can be measured.

SUMMARY OF THE INVENTION

It is the object of the present invention to provide a sensor for detecting a rotational movement or an angular acceleration, which has a simple and robust structural design.

The present invention is a sensor for detecting a rotational movement, an angular acceleration, a tilt or an acceleration, having at least one heating element which is arranged in a first plane extending at right angles to an axis of rotation, the heating element being adapted to produce in a fluid surrounding the heating element a convection flow zone through which an isothermal field is defined; and at least one sensor element, the fluid surrounding the sensor element, and the sensor element being adapted to be displaced relative to the isothermal field when a rotational movement or an angular acceleration takes place, wherein the heating element extends in the form of a circular arc or in form of an interrupted polygonal progression around the axis of rotation.

The present invention is based on the finding that the inertia of a locally heated fluid can be utilized for detecting a rotational movement or an angular acceleration. For this purpose, the fluid is heated in a local area by means of a heating element to a certain temperature and, by means of a rotational movement, the locally heated area and the heating element are moved relative to one another so that the locally heated area of the fluid will move e.g. towards a sensor element located adjacent the heating element, whereby the sensor element will detect a change in the temperature of the fluid and, consequently, a movement. For detecting a rotational movement or an angular acceleration, the heating element and the sensor element are preferably located on a common circle around the axis of rotation of the rotational movement or of the angular acceleration.

One advantage of the sensor according to the present invention is that it is robust, over-load-proof and capable of operating in any position and that it does not have any movable mass elements.

A further advantage of the sensor according to the present invention is that it is capable of carrying out self-tests.

Yet another advantage of the sensor according to the present invention is that it is suitable for modern mass production methods, e.g. in the field of microsystem technology and semiconductor production lines, and that it can be produced at a moderate price.

BRIEF DESCRIPTION OF THE DRAWINGS

In the following, preferred embodiments of the present invention will be explained in detail making reference to the drawings enclosed, in which.

DESCRIPTION OF THE PREFERRED EMBODIMENTS

Figure 1:
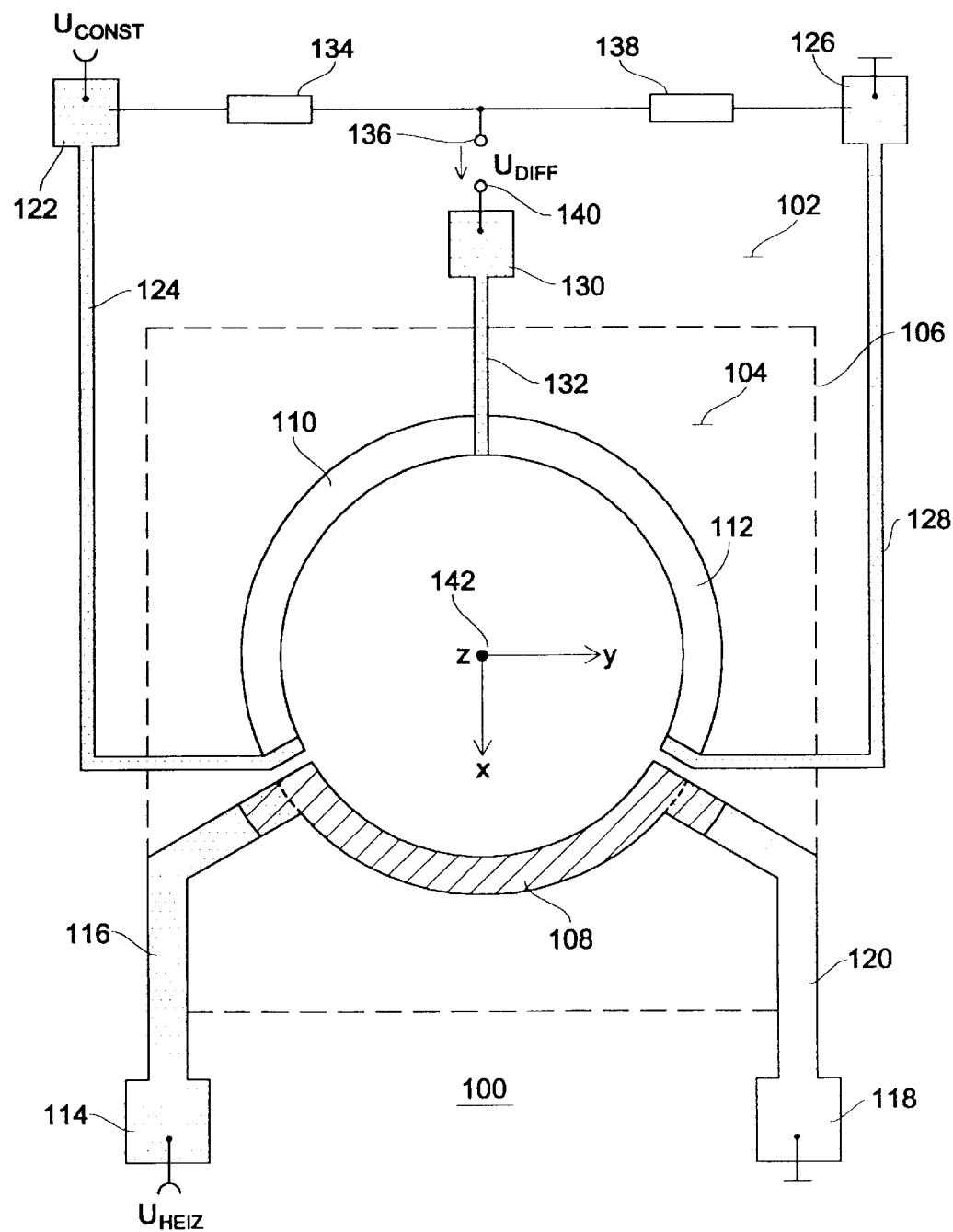
FIG. 1 shows a first embodiment of a sensor according to the present invention.

FIG. 1 shows a first embodiment of a sensor according to the present invention. A sensor 100 is located in a closed housing filled with fluid or in a capsule. The sensor 100 includes a substrate comprising an outer substrate area 102, which may consist e.g. of silicon, and an inner substrate area 104 which is preferably a diaphragm or a closed diaphragm, or a thin diaphragm or a closed thin diaphragm. The boundary between the outer substrate area 102 and the inner substrate area 104 is indicated by a boundary line 106. In the inner substrate area 104, e.g. on the diaphragm, a heating element 108 is provided, which has preferably a circular shape or the shape of a circular arc and, alternatively, the shape of a polygon and which is preferably implemented in the form of a conducting track. The heating element 108 is preferably made of NiCrNi and may, alternatively, be made of polysilicon, Pt, Au or Ni. When the heating element 108 consists of a material having a temperature coefficient of approx. zero (e.g. NiCrNi), it will absorb constant power when a constant voltage is applied thereto. This leads to an approximately constant increase in temperature in comparison with the substrate area 102. When other materials having a defined temperature coefficient are used, the temperature of the heating element can be ascertained and, if necessary, readjusted via the inherent resistance. In the inner substrate area 104, a first sensor element 110 and a second sensor element 112 are additionally provided, these sensor elements being preferably conducting tracks which have the shape of a quarter circle and which consist e.g. of Ni and, alternatively, of Pt or polysilicon. The first and second sensor elements 110, 112 and the heating element 108 are preferably located on one circle.

The sensor 100 is additionally provided with a first contact area 114 connected by a first conducting track 116 to a first end of the heating element 108 and with a second contact area 118 connected by a second conducting track 120 to a second end of the heating element 108. The first contact area 114, the fist conducting track 116, the second contact area 118 and the second conducting track 120 preferably consist of a metal, such as copper, silver, gold, etc. Between the first contact area 114 and the second contact area 118, a heating voltage $U_{HEAT}$ is applied via the thermal resistance of the heating element 108.

The sensor 100 is additionally provided with a third contact area 122 connected to a third conducting track 124 which is connected to a first end of the first sensor element 110, and with a fourth contact area 126 connected to a fourth conducting track 128 which is connected to a first end of the second sensor element 112. The third contact area 122, the third conducting track 124, the fourth contact area 126 and the fourth conducting track 128 consist preferably of a metal, such as copper, aluminium, gold, silver etc. A fifth contact area 130 is connected to a fifth conducting track 132 which extends to a connection point between a second end of the first sensor element 110 and a second end of the second sensor element 112 and connects these ends or establishes a contact between them. In addition, a first resistor 134 is provided between the third contact area 122 and a first measurement terminal 136 for measuring a differential voltage $U_{Diff}$, and a second resistor 138 is provided between the first measurement terminal 136 and the fourth contact area 126, the resistance value of this second resistor 138 corresponding to that of the first resistor 134. A second measurement terminal 140 is additionally provided on the fifth contact area 130 so as to be able to measure the differential voltage $U_{Diff}$ between the first and second measurement terminals 136, 140. A constant voltage $U_{const}$ is applied between the third contact area 122 and the fourth contact area 126.

Figure 11:
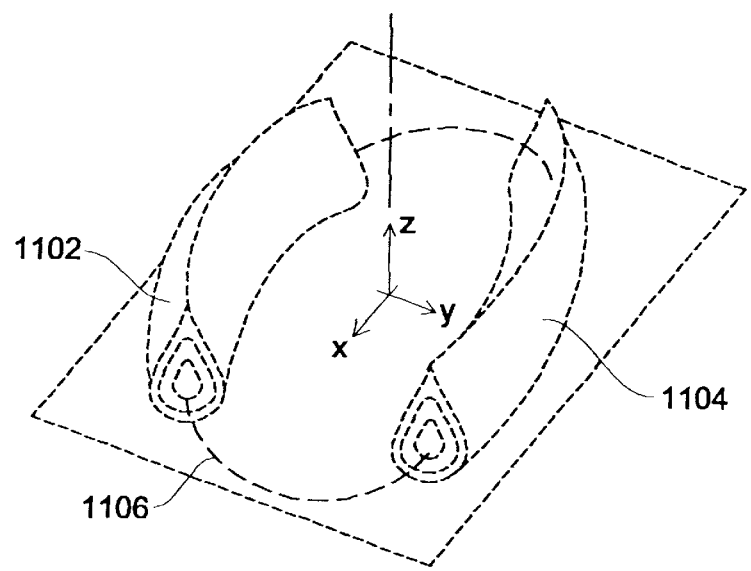
FIG. 11 show a schematic representation of the convection roll of the heating elements according to FIG. 5.

As has already been mentioned, the sensor 100 is located in a closed housing filled with fluid; the fluid fully encompasses at least the heating element 108 and the sensor elements 110 and 112. The heating element 108 heats the fluid surrounding it, whereby a convection flow zone is generated, which defines an isothermal field. When the sensor is rotated about an axis of rotation, i.e. a Z axis of the coordinate system 142, or when the fluid is rotated, or when the plane in which the sensor is rotated is tilted, e.g. about the Y axis, the heating element will move, e.g. due to an inertia of the fluid, relative to the isothermal field produced thereby in the fluid, so as to generate e.g. additional isothermal fields in neighbouring areas. In the case of a rotation about the Z axis, so-called circular segment-shaped convection rolls will be produced (FIG. 11). When, e.g. due to a rotation about the Z axis, a sensor element 110, 112 moves into the area of a convection roll or into an isothermal field, and when e.g. a thermal resistor is used as a sensor element, the resistance of the sensor element will change, whereby the rotational movement or the angular acceleration of the sensor 100 can be detected. When, as in FIG. 1, two sensor elements 110, 112 are provided on a first and on a second side of the heating element, the direction of movement can be determined by a change of resistance of one sensor element or the other. When the sensor tilts about the Y axis, or when the sensor tilts about the Y axis and rotates simultaneously about the X axis, the warmth of the isothermal field will move, e.g. by rising, to one or both sensor elements 110, 112, since the sensor elements 110, 112 are rotated about the Y axis away from the plane of FIG. 1 and towards the viewer and since the heating element 108 is tilted inwards. In this case, the tilt about the Y axis as well as a simultaneous rotation about the Z axis can be determined by an identical or different change of resistance of the sensor elements 110, 112.

By applying a heating voltage $U_{Heat}$ between the first contact area 114 and the second contact area 118, the heating element 108 has current supplied thereto via the conducting track 114, 116 so that it will be heated. Due to this heating, a heated area and a convection zone, respectively, are generated around the heating element 108, which define the isothermal field. The absolute temperature of the heating element 108 is adjusted by the voltage applied. When metallic heating elements are used, such as heating elements consisting of aluminium, Pt, Ni, the resistance value of the heating element is linearly dependent on the temperature to a first approximation, so that the temperature can be read via the resistance value of the heating element that can be measured between the first contact area 114 and the second contact area 118. This also applies to heating elements made of polysilicon.

The sensor elements 110 and 112 are connected in series via the third conducting track 124, the fifth conducting track 132 in a section between the second end of the first sensor element 110 and the second end of the second sensor element 112, and the fourth conducting track 128. Via this series connection, a constant voltage $U_{const}$ can be applied between the third contact area 122 and the fourth contact area 126. When the sensor elements 110, 112 have the same temperature, the series connection is a symmetric voltage divider. Between the contact areas 122, 126, this voltage divider has connected in parallel thereto a constantly symmetric voltage divider which consists of two identically dimensioned resistors 134, 138 and which impresses half of the constant voltage $U_{const}$ upon a first loop comprising the third conducting track 124, the first sensor element 110, the first and second measurement terminals 136, 140 and the fifth conducting track 132, and the other half of the constant voltage $U_{const}$ upon a second loop symmetrical to the first loop and comprising the fourth conducting track 128, the second sensor element 112, the fifth conducting track 132, the first and the second measurement terminals 136, 140.

When the first sensor element 110 is now moved into the area, preferably a convection roll, heated by the heating element 108, its resistance will change, increase in the case of metallized sensor elements, and the differential voltage $U_{Diff}$ between the first measurement terminal 136 and the second measurement terminal 140 will become positive. This is indicated by a left-hand rotation of the sensor 100 about the axis of rotation, i.e. the Z axis. When the second sensor element 112 is, however, moved into the convection roll of the heating element 108, its resistance will increase and the differential voltage $U_{Diff}$ will become negative. This is indicated by a right-hand rotation of the sensor.

A tilt or rotation of the sensor 100 about the Y axis can be determined in that the resistance value of both sensor elements 110 and 112 between the third contact area 122 and the fifth contact area 130, and between the fourth contact area 126 and the fifth contact area 130 increases or decreases identically, depending on whether the sensor elements are rotated away from or into the Y plane of FIG. 1.

A tilt of the sensor 100 about the Y axis with simultaneous rotation about the Z axis can be determined from the superposition of the above-mentioned effects for the rotation about the Z axis and the tilt about the Y axis, the tilt about the Y axis causing an identical change of the resistances of the sensor elements 110 and 112, an offset, and the rotation about the Z axis contributing to the resistance change with a differential fraction of the resistances of the sensor elements 110 and 112.

By means of the structure according to FIG. 1, rotational movements and angular accelerations and also tilts about an axis with simultaneous rotation about another axis and, consequently, also transverse accelerations can be measured. This means that either the sensor itself can be rotated so that the inertia of the fluid and the rotation of the sensor elements 110, 112 lead to a measurement effect, or the sensor 100 can be fixed and stationary, respectively, and the fluid can be caused to carry out a rotational movement, e.g. by means of a drive shaft, a propeller etc, as shown in FIG. 2.

Figure 2:
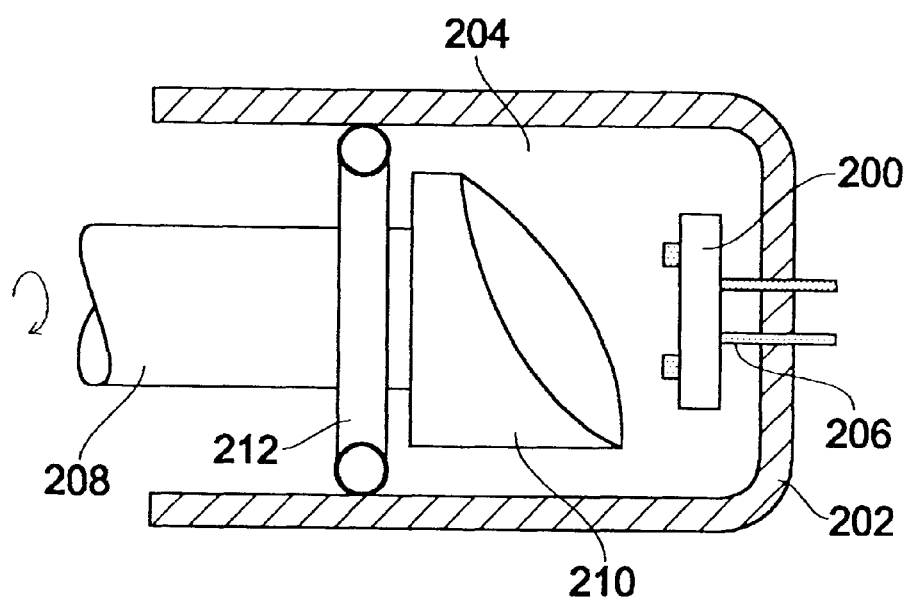
FIG. 2 shows an alternative arrangement of the sensor according to FIG. 1.

FIG. 2 shows an arrangement of a sensor 200 according to FIG. 1 in a housing 202 containing a fluid 204. The sensor 200 is secured in position on a support 206. Above the sensor 200 a shaft 208 rotates, which may have secured thereto e.g. a propeller, a tappet 210, etc. The shaft rotates about its axis and causes a rotational movement or an angular acceleration of the fluid 204, which can be measured by the sensor 200. In order to support the shaft 208 and in order to prevent the fluid 204 from leaving the housing section in which the sensor 200 is located, a support and sealing structure 212 is provided around the shaft 208, which seals the shaft from the housing 202.

Referring again to FIG. 1, the temperature of the heating element 108 can only be adjusted absolutely, i.e. it is impossible to determine to what extent the surroundings of the heating element 108 become gradually warmer when the rotational movement or the angular acceleration is being measured, and whether the temperature difference between the heating element 108 and the surroundings, the fluid, is still sufficiently large for permitting a good sensitivity of the sensor 100. This situation can be improved by using e.g. a series of thermoelements as a heating element 108.

Figure 3:
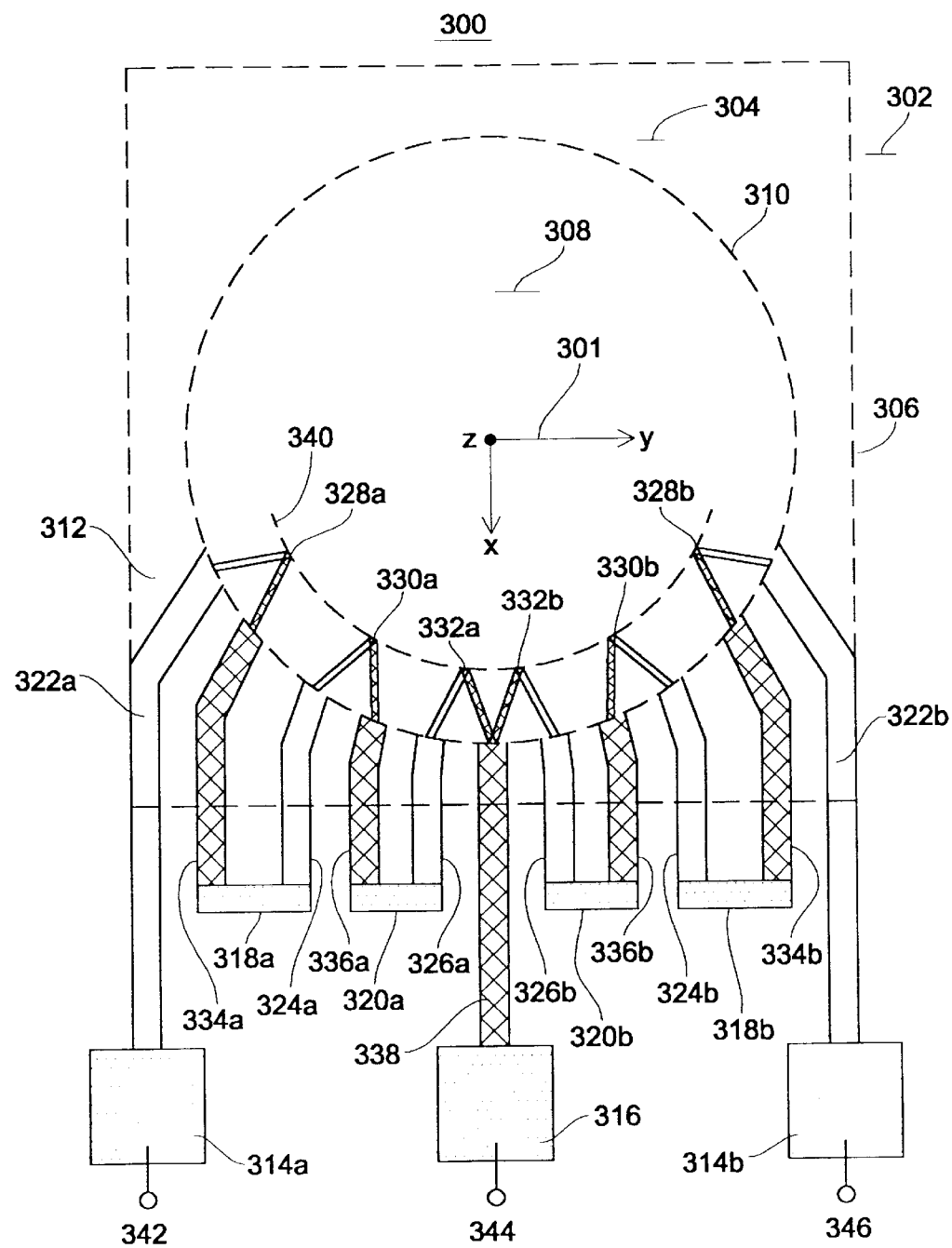
FIG. 3 shows a schematic representation of an alternative heating element for the sensor in FIG. 1.

FIG. 3 shows a schematic representation of an alternative heating element for the sensor of FIG. 1. The heating element 108 of FIG. 1 is here replaced by two series connections of thermoelements. A sensor 300 has a first substrate area 302, a second substrate area 304, the boundary of these substrate areas 302, 304 being indicated by a boundary line 306, and a third substrate area 308 whose boundary to the second substrate area 304 is outlined by a boundary line 310. The first and the second substrate areas 302, 304 preferably consist of a silicon substrate, and the third substrate area 308 is preferably a circular opening in the second substrate area 304 or a circular diaphragm, such as a thin diaphragm arranged above the opening in the second substrate area 304.

The first substrate area 302 and the second substrate area 304 have provided thereon contact and conductor patterns for a heating element 312. These contact and conductor patterns are connected to thermoelements. A first contact and conductor pattern is provided in a region on the left-hand side of the X axis of the coordinate system 301 and includes a first contact area 314a, a second contact area 316 and third and fourth contact areas 318a, 320a. The contact areas preferably consist of a highly conductive contact layer, such as gold, silver, copper, etc. A first conducting track 322a, a second conducting track 324a, a third conducting track 326a each have their first end connected to a first arm of a respective thermoelement 328a, 330a, 332a, the first arm consisting of the same material as the respective conducting track. The conducting tracks 322a, 324a, 326a and the first arms consist of a first material, which may e.g. be Ni, Pt, W, Cu, Fe, NiCr, Si and CuNi or a doped semiconductor. The first, second and third conducting tracks 322a, 324a, 326a each have their second ends connected to the respective contact areas 314a, 318a, 320a. A fourth conducting track 334a, a fifth conducting track 336a and a sixth conducting track 338 each have their first end connected to a second arm of the respective thermoelements 328a, 330a, 332a, the second arm consisting of the same material as the respective conducting track. The conducting tracks 334a, 336a, 338 and the second arms of the thermoelements 328a, 330a, 332a consist of a second material which is different from the first material of the conducting tracks 322a, 324a, 326a and which may e.g. be Ni, Pt, W, Cu, Fe, NiCr, Si, CuNi or a doped semiconductor. The conducting tracks 334a, 336a, 338 each have their second end connected to the respective contact areas 318a, 320a and 316. By means of the conducting tracks 322a, 334a, 324a, 336a, 326a and 338 and the contact areas 314a, 318a, 320a and 316, the thermoelements 328a, 330a, 332a are connected in series so as to define a first series connection of thermoelements.

A second contact and conductor pattern including thermoelements is provided in mirror symmetry with the X axis of the coordinate system 301 on the right-hand side of the X axis. Contact areas 314b, 318b and 320b of this second contact and conductor pattern correspond to the contact areas 314a, 318a and 320a of the first contact and conductor pattern which has already been described, and conducting tracks 322b, 324b, 326b, 334b and 336b correspond to the conducting tracks 322a, 324a, 326a, 334a and 336a of the first contact and conductor pattern which has already been described. A second series connection of thermoelements 328b, 330b, 332b is formed with these conducting tracks and contact areas; with regard to the conducting track 338 and the contact area 316, this second series connection of thermoelements is connected or poled oppositely to the first series connection of thermoelements, since the arrangement of the arms of the thermoelements is opposite to that of the first series connection of thermoelements. The first and second arms of the thermoelements 328a, 330a, 332a, 328b, 330b, 332b are interconnected on a respective pointed end or connection point. These pointed ends are preferably positioned on a common circular arc 340 and define individual heating points of the heating element 312.

Figure 4:
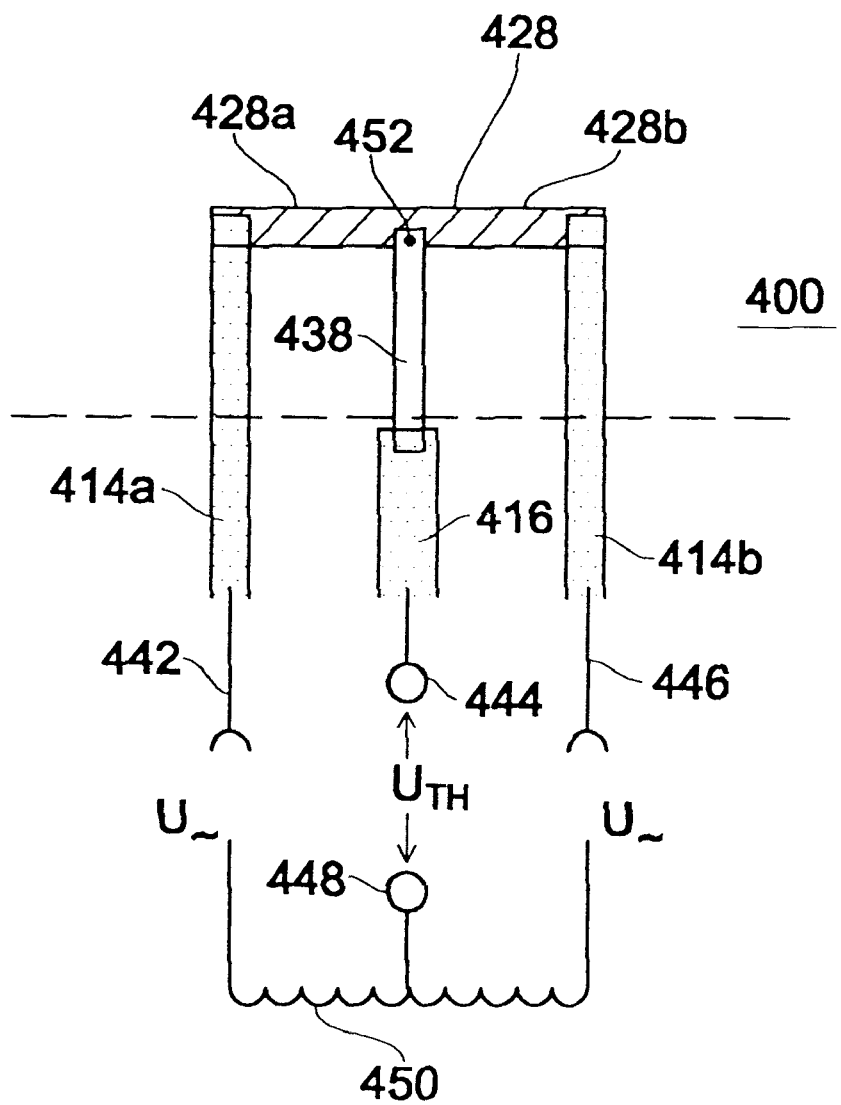
FIG. 4 shows a schematic representation of an equivalent circuit for a heating element according to FIG. 3.

FIG. 4 shows a schematic representation of an equivalent circuit 400 for a heating element 312 according to FIG. 3 and the connection of this heating element. The contact areas 414a, 414b and 416 correspond to the contact areas 314a, 314b and 316 in FIG. 3. The left part 428a of the conducting track 428 corresponds to the first arms of the thermoelements 328a, 330a, 332a and the associated conducting tracks 322a, 324a, 326a in FIG. 3, and the right part 428b of the conducting track 428 corresponds to the first arms of the thermoelements 328b, 330b, 332b and the associated conducting tracks 322b, 324b, 326b in FIG. 3. Like the above-mentioned conducting tracks of FIG. 3, also the conducting track 428 consists of a first material, preferably constantan. The conducting track 438 in FIG. 4 corresponds to the conducting tracks 334a, 336a, 338, 334b and 336b in FIG. 3 and consists also of a second material which differs from the first material and which is preferably copper. The terminals 442, 444 and 446 correspond to the terminals 342, 344 and 346 in FIG. 3. The terminal 442 and the terminal 446 have applied thereto identical alternating voltages for heating the thermoelements. The thermovoltage $U_{TH}$ is tapped at the terminal 444 and a terminal 448 of a symmetric transformer 450. The alternating voltages at the terminals 442, 446 are preferably supplied by the symmetrically divided transformer 450.

Making reference to FIGS. 3 and 4, the function of the heating element of FIG. 3 will now be described. At the point of contact or connection point between two different metals, a thermovoltage is generated, since the metals have different work functions of the electrons. In the case of FIG. 4, the contact areas 414a, 414b and 416 have a first temperature, whereas the connection area or connection point 452 between the conducting track 438 and the conducting track 428 has a second, preferably higher temperature. The connection point 452 corresponds to the tips of the heating elements of FIG. 3. The thermovoltage $U_{TH}$ is determined by a material constant which characterizes the transition from the material of conducting track 428, the first material, to the material of conducting track 438, the second material, multiplied by the temperature difference between the temperature at connection point 452 and the temperature at the contact areas 414a, 416, 414b. The material constant here describes e.g. the transition between constantan and copper or the linear dependence of the thermovoltage $U_{TH}$ between two materials on the temperature difference between these materials.

Since the thermovoltage describes the temperature difference between the connection point 452, i.e. here the heating point, and the surroundings, it can be guaranteed that, by heating the thermoelement or the thermoelements or the tip or tips thereof more strongly, a high temperature difference between the convection roll produced and the rest of the surroundings as well as a high measuring sensitivity are maintained, even if the fluid surrounding the sensor warms up. This is an advantage in comparison with the heating element 108 of FIG. 1, which can only be adjusted to an absolute temperature. It follows that the temperature difference between the heating element and the surroundings can be adjusted and readjusted, respectively, with the alternating voltage of the transformer 450 in dependence upon the thermovoltage $U_{TH}$ at the terminals 444, 448. A further advantage of the thermoelements of the heating element according to FIG. 4 is that the inertia of these thermoelements is lower in comparison with that of the resistance heater of FIG. 1.

Referring again to FIG. 3, the thermoelements of the series connections of thermoelements define a heating element which extends along the circle 340 and which is heatable at the points of contact or connection points of the first and second arms of the thermoelements 328a, 330a, 332a, 328b, 330b, 332b; this permits uniform heating over the whole area of the heating element 312. The series connections of thermoelements are also referred to as thermopiles.

It should be pointed out that, instead of the sensor elements 110, 112 shown in FIG. 1, it is also possible to use thermopiles for detecting the temperature over a certain three-dimensional space via the thermovoltage of the thermoelements, the thermopiles being preferably realized with a differential connection of two or more thermopiles.

Figure 5:
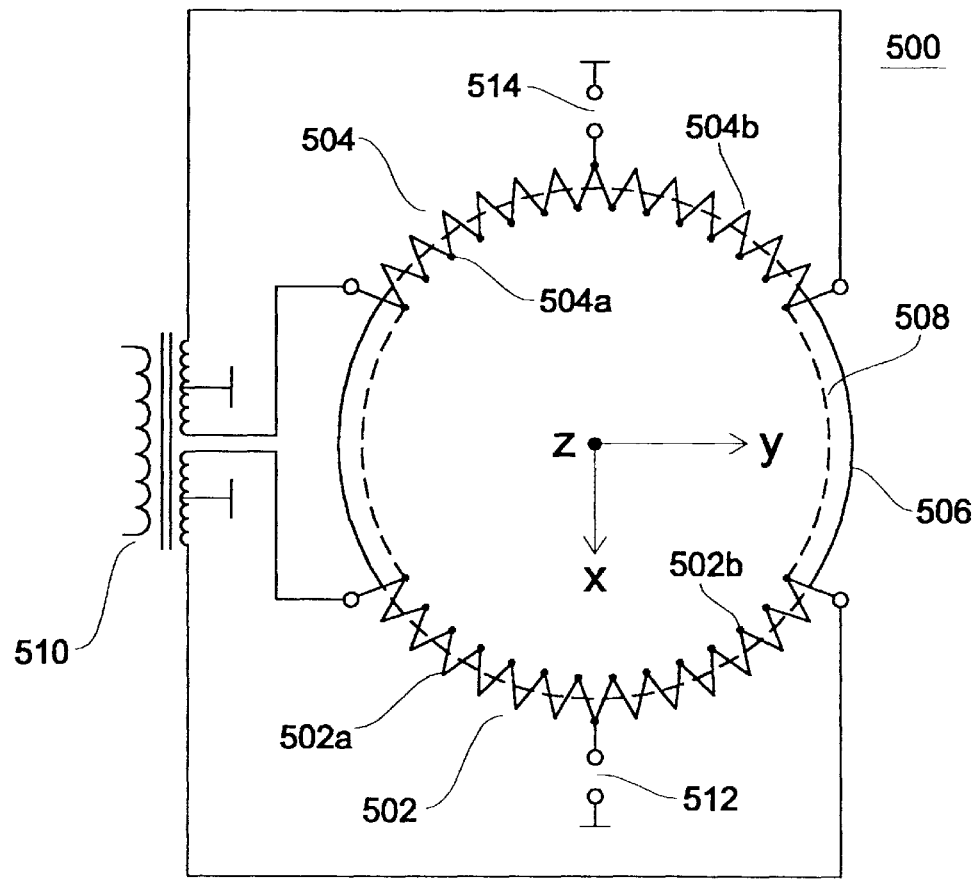
FIG. 5 shows a second embodiment of a sensor according to the present invention with two heating elements according to FIG. 3.

FIG. 5 shows a second embodiment of a sensor 500 according to the present invention, which makes use of two heating elements according to FIG. 3. Two heating elements 502, 504 are arranged on a circle 506 about the Z axis, i.e. axis of rotation, such that they are displaced relative to one another by 180°. This circle 506 describes e.g. an opening in a substrate above which the heating elements 502, 504 are arranged, or a circular diaphragm on which the heating elements 502, 504 are arranged, so as to heat there a fluid which surrounds the sensor 500. Each of the heating elements 502, 504 consists of two counterconnected series connections 502a, 502b and 504a, 504b of thermoelements, as can be seen in FIG. 3. The individual ends of the thermoelements are arranged on a circle 508 above e.g. the diaphragm so as to heat the fluid there on this circular line. Each heating element generates, in turn, an isothermal field which moves relative to the respective heating element in response to a rotational movement or angular acceleration of the sensor 500 about the axis of rotation, i.e. Z axis, or in response to a rotational movement or angular acceleration of the fluid, and which is detected e.g. by a sensor element located adjacent thereto e.g. on the circle 506, the sensitive area of this sensor element being also arranged along the circle 508. Two 180°-displaced sensor elements, which are preferably resistance heating elements according to FIG. 1 or series connections of thermoelements according to FIG. 3 and which have similar dimensions as the heating elements, may e.g. be arranged adjacent to and on either side of the heating elements 502, 504. When the sensor now rotates e.g. about the Z axis, a resistance change or a temperature change will be detected either by one sensor element or the other, and, depending on the sensor element which responds, the direction of rotation will be detected as well. By means of such an arrangement, it is e.g. also possible to detect the rotation of the sensor 500 about the X axis; in this case only one sensor element at a time will be heated on the circle 506 on the left-hand side or on the right-hand side of the heating elements 502, 504 in FIG. 5 and thus be able to indicate the direction, rate and the acceleration of the rotation.

FIG. 5 additionally shows how the sensor 500 is interconnected. As can be seen in FIG. 4, each of the heating elements 502, 504 has applied thereto two identical alternating voltages by a symmetric transformer 510. A respective thermovoltage of the individual heating elements 502, 504 can again be tapped at terminals 512, 514; by means of this thermovoltage, the temperature of the fluid or of the isothermal fields, or, more precisely, of the tips of the thermoelements, relative to the surroundings, e.g. outside of the circle 506, can be controlled via the alternating voltages. This has already been described hereinbefore in connection with FIGS. 3 and 4.

Figure 6:
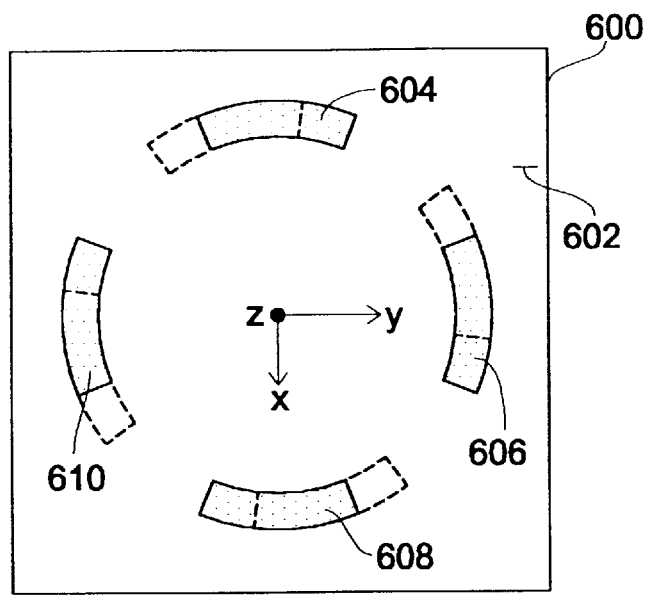
FIG. 6 shows a third embodiment of a sensor according to the present invention.

FIG. 6 shows a third embodiment of a sensor according to the present invention. A sensor 600 comprises four heating elements, which are simultaneously sensor elements, or four heating/sensor elements 604, 606, 608, 610, which are arranged on a substrate 602 along a circle, e.g. around an opening in the substrate 602 or around a circular diaphragm above the opening etc, such that they are displaced by 90° relative to one another. The heating/sensor elements 604 to 610 are preferably resistance heaters, like the heating element 108 in FIG. 1, or thermoelements or series connections of thermoelements, like the heating element 312 in FIG. 3. The heating/sensor elements 604–610 each produce isothermal fields or convection rolls by a flow of current through the heating or measuring resistors or by a.c. heating of the thermoelements, and, in the case of a rotation and acceleration, respectively, of the sensor, a respective heating/sensor element moves relative to the convection roll produced thereby, so as to move into cooler areas, whereby the respective heating/sensor element itself will be cooled down. This cooling down can be measured by the heating resistors through a change in the resistance and by the thermoelements through a change in the thermovoltage. A rotational movement and an angular acceleration can be detected in this way. FIG. 6 shows, in broken lines, at the heating/sensor elements 604–610 the respective convection rolls (FIG. 11) of the heating elements 604–610 produced when the sensor 600 carries out a rotation to the right. When heating resistors are used as heating/sensor elements, these heating resistors are readjusted to the previous absolute temperature, when they have cooled down due to rotation, and when thermoelements are used as heating/sensor elements, these thermoelements are readjusted to the previous temperature relative to the surroundings.

By means of a structure according to FIG. 6 comprising heating/sensor elements 604–610, only the occurrence of a rotation can be determined, but not the direction of rotation, since the sensors are not able to detect the direction of rotation as such. This is only possible by means of the thermoelements according to FIG. 3, when the thermovoltages between the contact areas 342 and 344, and 344 and 346, respectively, are measured separately. Rotations about the X axis and the Y axis can, however, be detected by the sensor 600, since, in response to a tilt about one of these axes, the convection, i.e. rise of the heat, will cause the convection rolls to move away from the heating/sensor elements or towards the same from other heating/sensor elements and cause a change in the temperature towards higher or lower temperatures. When a tilt about the X axis occurs, in the case of which e.g. the heating/sensor element 610 of FIG. 6 is rotated, the generated heat of the heating/sensor element 606 moves from this heating/sensor element 606 to the heating/sensor element 610, which has the effect that the heating/sensor element 606 is cooled down and the heating/sensor element 610 is first cooled down and then heated. It follows that, about the X axis an the Y axis, it is possible to determine the occurrence of a rotation as well as a the direction of this rotation.

Figure 6A:
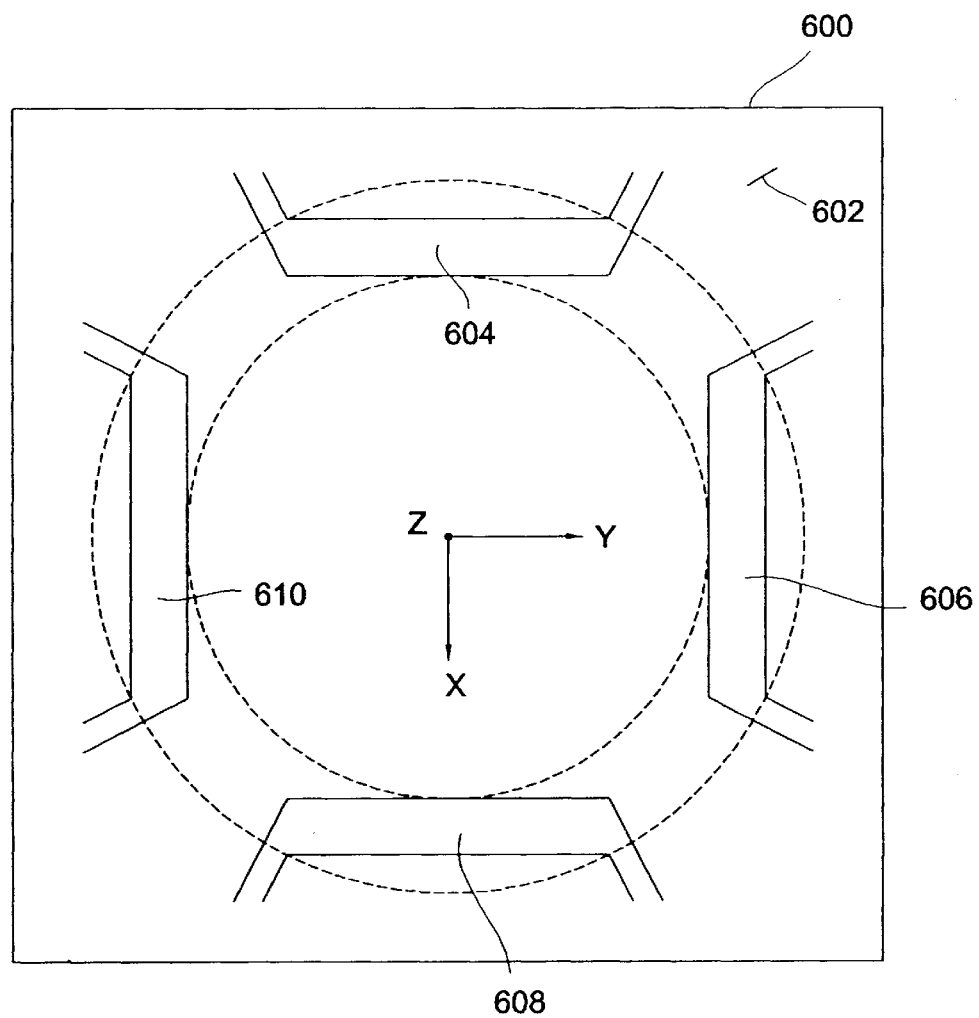
FIG. 6a shows a polygon-shaped arrangement according to FIG. 6.

FIG. 6a shows a polygon-shaped arrangement according to FIG. 6; the elements 604 to 610 can here consist of resistance paths or thermoelements in series. It is here again possible to determine the direction of rotation, when two opposed elements (e.g. 604 to 608) are heated alternatively and the respective other elements (606 to 610) are used as sensors. The function is similar to the function that has been described making reference to FIG. 1.

Figure 7:
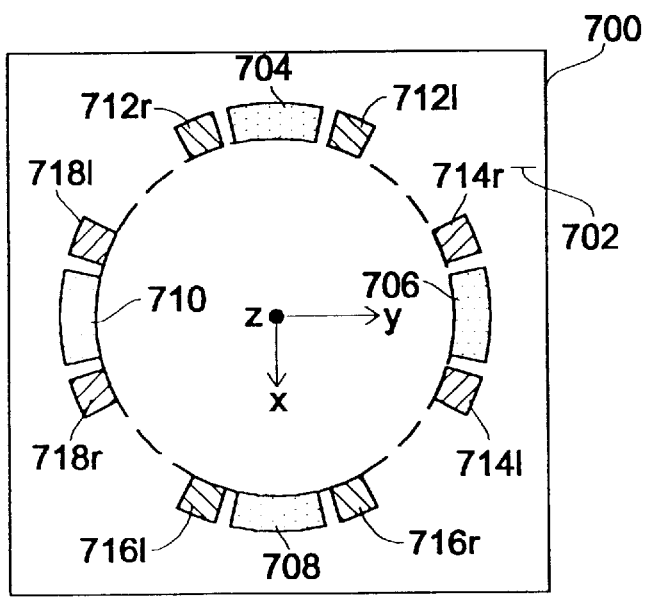
FIG. 7 shows a fourth embodiment of a sensor according to the present invention.

FIG. 7 shows a fourth embodiment of a sensor according to the present invention. Similar to the sensor according to FIG. 6, a sensor 700 comprises four heating elements 704, 706, 708 and 710 which are preferably arranged along a circular line on a substrate 702 such that they are displaced relative to one another by 90°. Each heating element has a first and a second side along the circular line. Adjacent to each of these sides of a respective heating element 704–710 a respective sensor element 712*r* and 712*l*, 714*r* and 714*l*, 716*r* and 716*l*, 718*r* and 718*l* is arranged along the circular line.

The heating elements 704–710 again produce a convection roll (FIG. 11) around them, which can be detected by the neighbouring sensor elements 712–718 in the case of rotation. Due to the fact that the sensor elements 712–718 are arranged on the right-hand side and on the left-hand side, it is additionally possible to detect the direction of rotation, since, e.g. in the case of a right-hand rotation of the sensor 700 about the Z axis, the sensors 712*r*–718*r* will be touched by the respective convection roll of the respective heating element 704–710 and warm up, whereby the right-hand rotation or angular acceleration can be detected. The same applies to a left-hand rotation in the case of which the sensors 712*l*–718*l* are seized by the respective convection roll. One advantage obtained in this respect is that either all sensors 712*r*–718*r* or all sensors 712*l*–718*l* detect the right-hand or left-hand rotation, whereby the sensitivity for a respective direction of rotation will be increased substantially by a higher number of measuring signals. In addition to the detection of a rotation about the Z axis, the structure according to FIG. 7 also permits the detection of tilts and rotations about the X and Y axis, as will be explained in detail in the following.

Figure 7A:
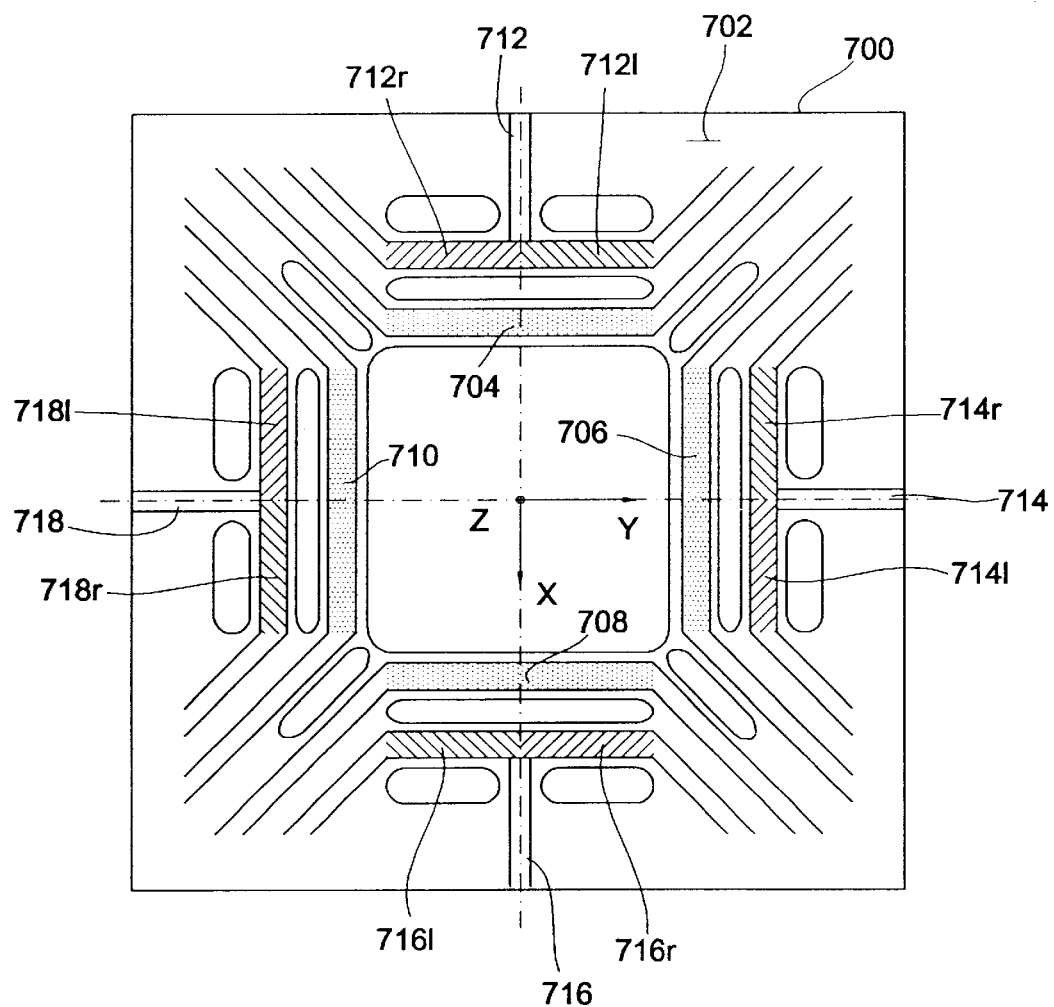
FIG. 7a shows a polygon-shaped arrangement according to FIG. 7.

FIG. 7*a* shows a polygon-shaped arrangement according to FIG. 7. In order to achieve a reduction of the external dimensions of the sensor, the heaters and the sensors are, however, arranged on two circular paths or polygonal progressions with different radii. The sensors 712*r*, 712*l*, 714*r*, 714*l*, 716*r*, 716*l* and 718*r*, 718*l* are combined in a path provided with a centre tap 712, 714, 716 and 718. Since it is not the centre but the outer area of the convection roll that is detected by the sensors, cantilevered structures or structures on a diaphragm having an opening provided therein will be advantageous so as to reduce the inertia as far as possible. Heaters and sensors can again consist of resistance paths or thermoelements in series or a they can be used in a mixed mode of arrangement.

Figure 8:
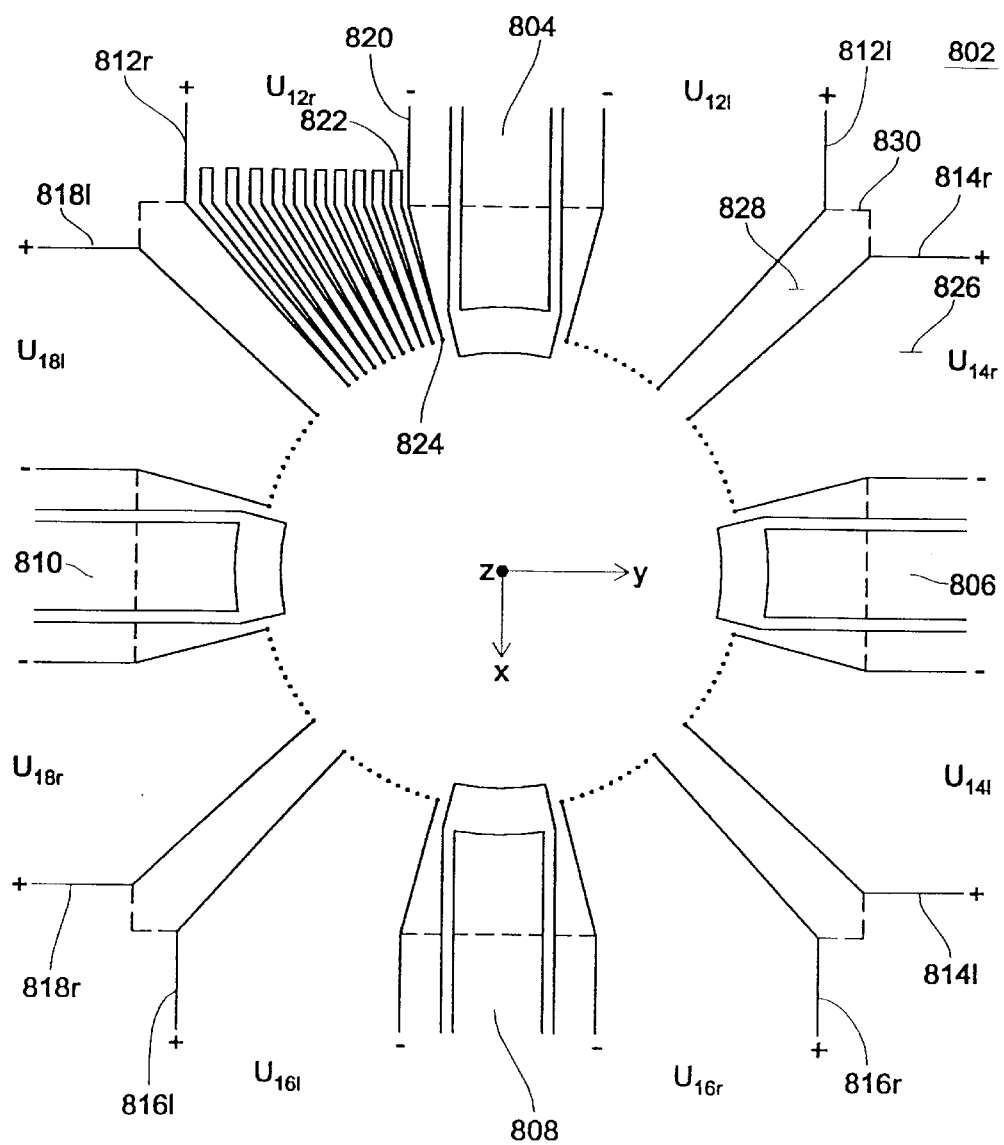
FIG. 8 shows a schematic representation of a realization of the fourth embodiment according to FIG. 7.

FIG. 8 shows a schematic representation of a realization of the fourth embodiment according to FIG. 7. As in FIG. 7, four heating elements 804, 806, 808, 810 or 804–810 are arranged on a substrate 802 preferably on a circular line such that they are displaced by 90° relative to one another. Each heating element has, when see in the direction of the circular line, a first side and an opposed second side, i.e. a first and a second end, respective sensor elements 812*r* and 812*l*, 814*r* and 814*l*, 816*r* and 816*l* as well as 818*r* and 818*l* being arranged adjacent these first and second sides. The heating elements 804–810 are preferably resistance heaters made of NiCrNi and, alternatively, they may be thermoelements or series connections of thermoelements according to FIG. 3. The sensor elements 812–818 are series connections of thermoelements or thermopiles in which thermoelements comprising each two arms 820, 822 that are made of different metallic materials, such a Pt, Ni, W, Cu, Fe, NiCr, Si, CuNi, are used, the temperature at the connection points 824 of these arms 820, 882, or at the tips of the thermoelements, being measured in the case of these sensor elements. The arms of the thermoelements of a sensor element are designed such that they are arranged in a graded, side-by-side relation with one another along the circular line with different lengths of the arms, as can be seen in FIG. 8 in the case of the sensor element 812*r*. The substrate 802 shown in FIG. 8 is divided by a line 830 into two sections, an outer section 826 and an inner section 828. The outer section 826 is preferably a rigid substrate consisting e.g. of silicon etc. Also the inner section 828 of the substrate 802 may e.g. be a rigid section consisting of silicon, by way of example. This inner section 828 of the substrate 802 has arranged thereon the sensor elements and the heating elements. The inner section 828 may additionally have an opening or it may be an opening in the outer section 826 of the substrate 802 above which the heating elements and the sensor elements are arranged in a cantilevered mode of arrangement, or the inner section 828 may be provided with a diaphragm or it may be a diaphragm which is arranged above an opening in the inner section 828 or above the inner section 828 and which has provided thereon the heating elements and the sensor elements.

Depending on the measured resistance of the respective heating element or heating resistor, the heating elements 804–810 are controlled to an absolute temperature via a current. Each of the sensor elements 812–818 has two terminals (+, −) at which the respective thermovoltage $U_{12r}$, $U_{12l}$, $U_{14r}$, ... of the sensor element in question 812*r*, 812*l*, 814*r*, ... can be tapped, whereby a determination of the temperature relative to the surroundings is possible and whereby it is additionally possible to control the temperature of the neighbouring heating elements 804–810 not only absolutely but also relatively.

The sensor elements can be interconnected in different ways so as to detect different directions of rotation. For detecting a direction of rotation or an angular acceleration of the sensor of FIG. 8 about the Z axis, the difference delta ($U_z$) is formed between the sum of all measuring signals or thermovoltages $U_{12r}$, $U_{14r}$, $U_{16r}$, $U_{18r}$ of the sensor elements 812*r*, 814*r*, 816*r*, 818*r* on the left-hand side of each heating element 804, 806, 808, 810 or 804–810 and the sum of all measuring signals or thermovoltages $U_{12l}$, $U_{14l}$, $U_{16l}$, $U_{18l}$ or $U_{12r}$–$U_{18l}$ of the sensor elements 812*l*, 814*l*, 816*l*, 818*l* or 812*l*–818*l* on the right-hand side of each heating element 804–810.

$$\text{delta}(U_z) = (U_{12r} + U_{14r} + U_{16r} + U_{18r}) - (U_{12l} + U_{14l} + U_{16l} + U_{18l}) \quad (1)$$

If positive, this difference represents a right-hand rotation of the sensor 800, and, if negative, it represents a left-hand rotation of the sensor 800 about the Z axis. By means of this signal rotational movements as well as angular accelerations can be detected. For detecting a rotation or a tilt of the sensor of FIG. 8 about the X axis, the difference delta($U_x$) is formed between the sum of the measuring signals or thermovoltages $U_{14r}$ and $U_{14l}$ of the sensor elements 814*r* and 814*l* and the sum of the measuring signals or thermovoltages $U_{18l}$ and $U_{18r}$ of the sensor elements 818*l* and 818*r*.

$$\text{delta}(U_x) = (U_{14r} + U_{14l}) - (U_{18l} + U_{18r}) \quad (2)$$

If positive, this difference represents e.g. a positive rotation about the X axis (right-hand helix in X direction), and, if negative, it represents a negative rotation of the sensor about the X axis in FIG. 8. For detecting a rotational movement or a tilt of the sensor of FIG. 8 about the Y axis, the difference delta($U_y$) is formed between the sum of the measuring signals or thermovoltages $U_{12r}$ and $U_{12l}$ of the sensor elements 812r and 812l and the sum of the measuring signals or thermovoltages $U_{16l}$ and $U_{16}r$ of the sensor elements 816l, 816r.

$$\text{delta}(U_y) = (U_{12r} + U_{12l}) - (U_{16r} + U_{16r}) \qquad (3)$$

If positive, this difference represents e.g. a positive rotation of the sensor 800 about the Y axis, and, if negative, it represents a negative rotation of the sensor 800 about the Y axis in FIG. 8. In the above it has been assumed that the thermovoltage increases in response to heating when a thermoelement is used as a sensor element. In the present case, this means that, e.g. in the case of a right-hand rotation of the sensor about the Y axis, the thermoelements 812r, 812l are rotated away from the plane of FIG. 8, the heat of the heating element 808 moving "upwards" towards the thermoelements 812r, 812l, i.e. the thermoelements 816l, 816r will slightly cool down and their thermovoltage will decrease, whereas the thermoelements 812r, 812l will be heated by the rising heat of the heating element 808 so that their temperature and thermovoltage will increase. Hence, a positive differential voltage delta($U_y$) will be produced, which is indicative of a positive rotation about the Y axis. The rotations about the X axis, Y axis and Z axis can e.g. also be used for detecting transverse accelerations by means of the structure of FIG. 8, provided that the results of equations (1), (2) and (3) are appropriately combined.

The structures of FIG. 7 and FIG. 8 can also be used for carrying out a self-test of the sensor. One possibility is to heat e.g. each heating element 804–810 individually or to heat all heating elements together, and to observe the reaction of the directly adjacent or of remote sensor elements 812r, 812l, 814r, 814l, a certain nominal behaviour occurring when the sensor functions properly being used as reference value. The heating elements may e.g. have applied thereto an alternating signal, preferably a square-wave signal, individually, or this alternating signal may be applied to all the heating elements, and the temperature rise behaviour of neighbouring sensor elements in the case of a high square-wave signal (heating element ON) and the temperature drop behaviour in the case of a low square-wave signal (heating element OFF) can be observed so as to examine the function of the sensor element or, on the basis of this function, also the function of the heating element or heating elements. This can be derived e.g. from the response behaviour or the response time of neighbouring sensor elements to an increase in temperature or to an activation of a heating element.

A further possibility of carrying out a self-test is the provision of an additional heating element arranged adjacent a respective sensor element so as to test the response behaviour of this sensor element by applying a predetermined heating curve (square-wave signal) and testing the reaction of the sensor element to this curve. This additional heating element can, selectively, also be switched on and off together with the existing neighbouring heating elements so as to test a reaction of the sensor element.

A self-test is preferably carried out when the sensor is not subjected to an angular acceleration or rotational movement, so as to compare e.g. a predetermined nominal behaviour with the behaviour of the sensor. When the sensor is, however, subjected to a rotational movement or an angular acceleration, a self-test can be carried out e.g. by a voltage superimposed on the existing heating voltage, an offset, which causes a superimposed verifiable reaction of the sensor element.

Figure 9:
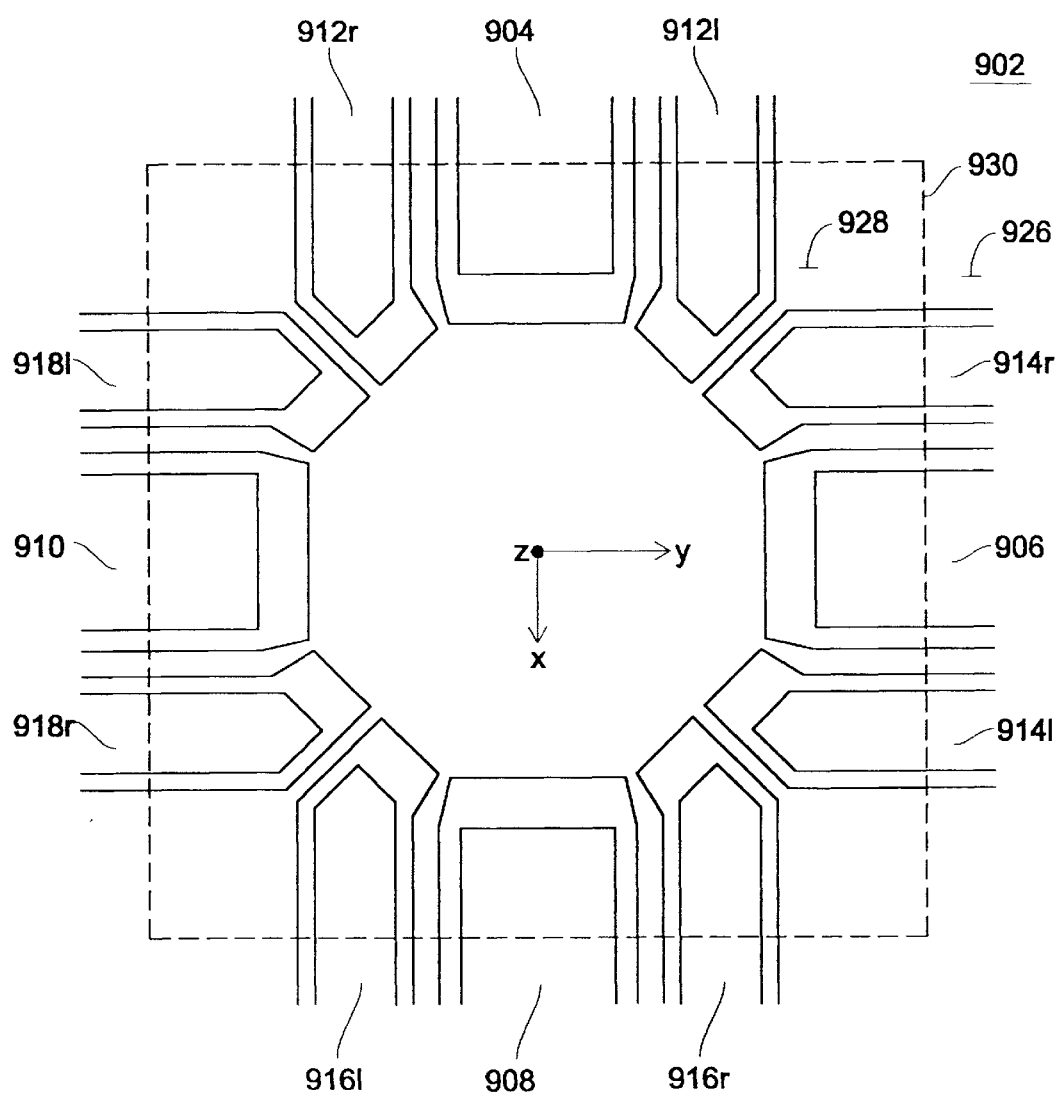
FIG. 9 shows a schematic representation of an alternative realization of the fourth embodiment according to FIG. 7.

FIG. 9 shows a schematic representation of an alternative realization of the fourth embodiment according to FIG. 7. A sensor is provided with a substrate 902 which is divided into an outer section 926 and an inner section 928 by a line 930, as can be seen in FIG. 9. The substrate 900 can be implemented in the way described in FIG. 8. As in FIG. 8, the substrate 902 has arranged thereon heating elements 904–910 and respective sensor elements 912r and 912l, 914r and 914l, 916r and 916l, 918r and 918l which are located adjacent these heating elements. The heating elements 904–910 and the sensor elements 912–918 are preferably arranged in a polygon shape; this permits a simplified production of the heating elements and of the sensor elements in comparison with the primarily more expensive circular sensor elements (thermoelements) of FIG. 8. In contrast to FIG. 8, the sensor elements 912–918 are now measuring resistors consisting preferably of Ni and the heating elements 904–910 are measuring resistors consisting preferably of NiCrNi (constantan). Alternatively, the measuring resistors of the sensor elements and of the heating elements may also consist of polysilicon.

In the case of one alternative of a sensor according to FIG. 9, the measuring resistors of the sensor elements 912–918 may actively be controlled to a second temperature which is lower than the temperature of the heating elements 904–910, whereby a measurement of the angular acceleration will be possible by power control of the sensor elements. The control of the sensor elements to a lower temperature also permits a higher measurement sensitivity.

Figure 10:
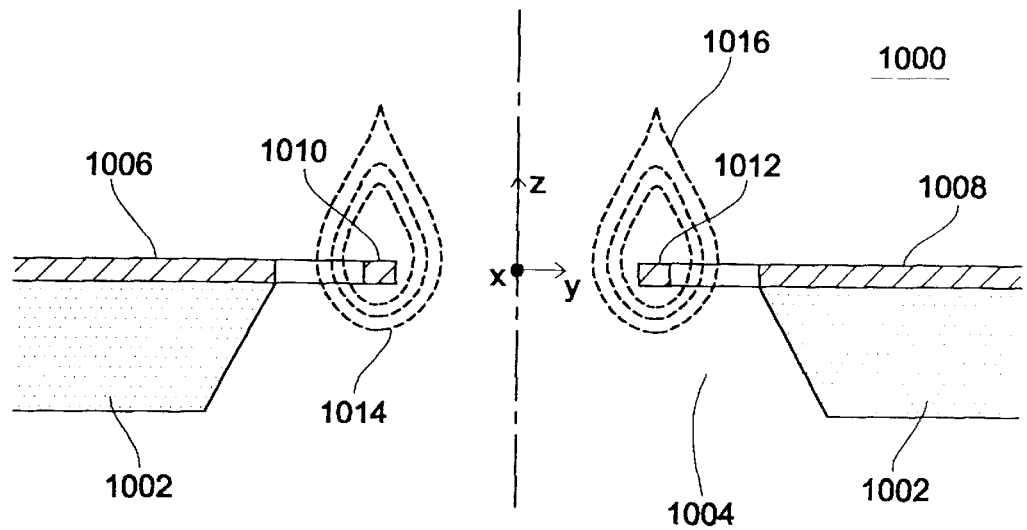
FIG. 10 shows a schematic sectional view of an arrangement of the heating elements according to FIG. 5, 6, 7, 8 or 9.

FIG. 10 shows a schematic sectional view of an arrangement of the heating elements of e.g. FIG. 5. A sensor 1000 is provided with a substrate 1002 having an opening 1004 provided therein. Above this opening 1004, e.g. two tips 1010, 1012 of thermoelements 1006, 1008, such as tips of the series connections 502, 504 of thermoelements in FIG. 5, which have e.g. a contact and conductor pattern corresponding to that of FIG. 3, are arranged or arranged in a cantilevered mode of arrangement. The thermoelements 1006, 1008 are used as heating elements as in FIG. 5; hence, a candle-shaped isothermal field 1014, 1016 with individual isotherms will form around the respective tip. The candle-shape results from the fact that the heat moves upwards in the direction of the Z axis. As e.g. in FIGS. 7, 8 and 9, sensor elements can be arranged adjacent the heating elements; when the sensor and the fluid, respectively, rotate about the Z axis, these sensor elements will come into contact with the isothermal field produced by the heating elements and be heated in this way.

FIG. 11 shows a schematic representation of the convection rolls of the heating elements of FIG. 10. Due to the rotation of the individual heating elements 1010, 1012 in FIG. 10 about the Z axis, envelope volumes are described by the isothermal fields, these envelope volumes being normally referred to as convection rolls 1102, 1104. The convection rolls 1102, 1104 describe a circular shape which is indicated by a line 1106. When a sensor is moved, not only the heating elements will move and produce the convection rolls, but sensor elements will enter the convection rolls and be heated, whereby the measurement effect of the present invention is determined.

Figure 12:
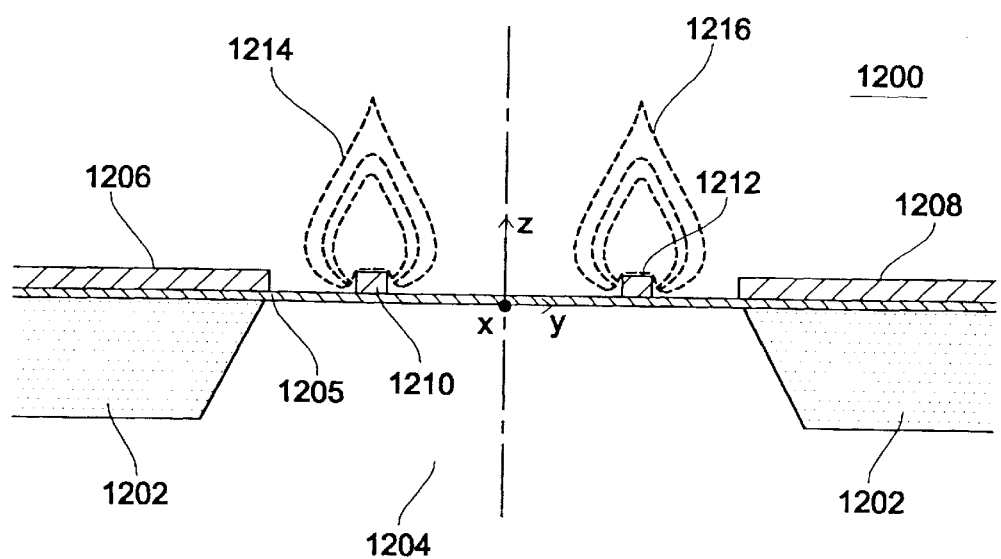
FIG. 12 shows a schematic sectional view of an alternative arrangement of the heating element according to FIG. 5.

FIG. 12 shows a schematic sectional view of an alternative arrangement of the heating elements of e.g. FIG. 5. In contrast to FIG. 10, the heating elements are not arranged in a cantilevered mode of arrangement. The sensor 1200 in FIG. 12 is provided with a substrate 1202 with an opening 1204 above which a support element, e.g. preferably a thin diaphragm 1205 having a low thermal capacity, is arranged, which closes the opening 1204. This diaphragm has e.g. arranged thereon thermoelements 1206 and 1208 provided with respective heating tips 1210 and 1212, as has been described e.g. in connection with FIG. 10. These thermoelements also produce isothermal fields 1214 and 1216, which, however, do not strongly penetrate into the diaphragm so that the isothermal fields 1214, 1216 slightly differ from the isothermal fields 1014, 1016 according to FIG. 10. In the case of a rotation about the Z axis, the heaters also form convection rolls of the type shown schematically in FIG. 11.

Figure 13A:
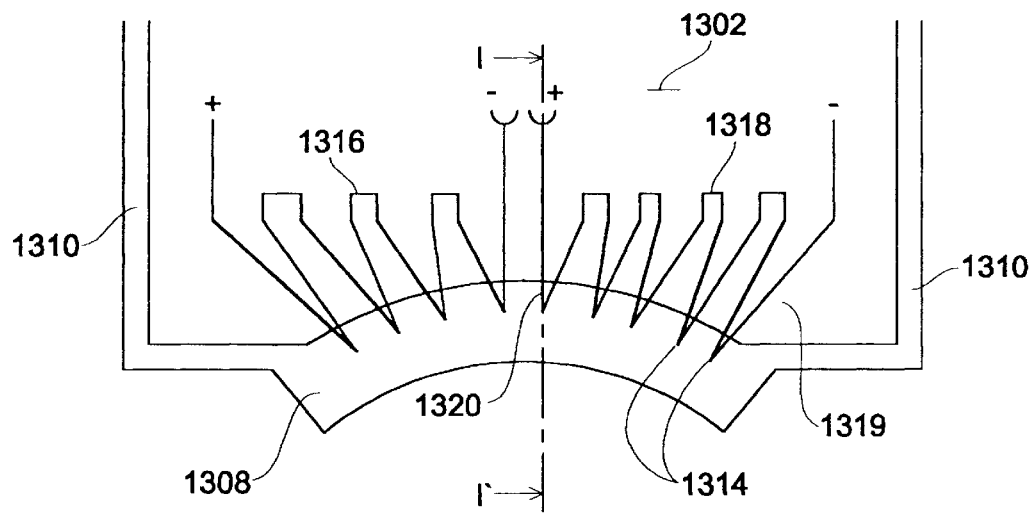
FIGS. 13A and B show a top view and a sectional view along the line 1–1' of a fifth embodiment of a sensor according to the present invention.
Figure 13B:
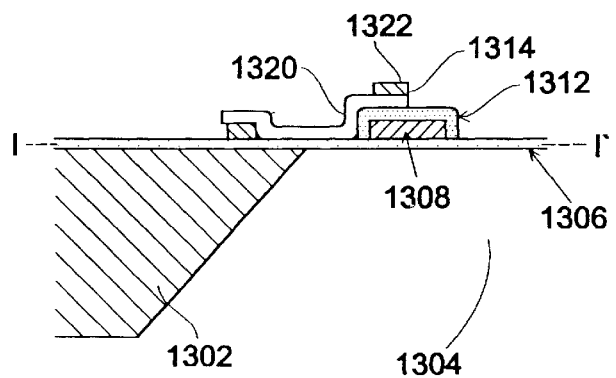

FIGS. 13A and 13B show in a top view and in a sectional view a fifth embodiment of a sensor according to the present invention. In contrast to the above-described sensors, FIGS. 13A and 13B show a sensor in the case of which the heating elements and the sensor elements are arranged one on top of the other. On a substrate 1302, a diaphragm 1306 is provided on top of an opening 1304 in the substrate 1302. This diaphragm 1306 has applied thereto a heating element 1308, preferably a resistance heater, which defines a circular conducting track and which is supplied with current via conductive strips 1310. The heating element 1308 has applied thereto an insulation 1312, which electrically insulates the heating element 1308 from individual tips 1314 or connection points of two series connections 1316, 1318 of thermoelements defining a sensor element 1319. The individual arms 1320 and 1322 of the thermoelements each consist of a first material and a second material between which a thermovoltage is created at the tips 1314. When the heating element 1308 is heated, isothermal fields will form above the heating element 1308, and when a rotation of the whole sensor about the Z axis moves the tips 1314 of the sensor element 1318 away from the isothermal fields, these tips will cool down, whereby a rotation can be detected.

Figure 14:
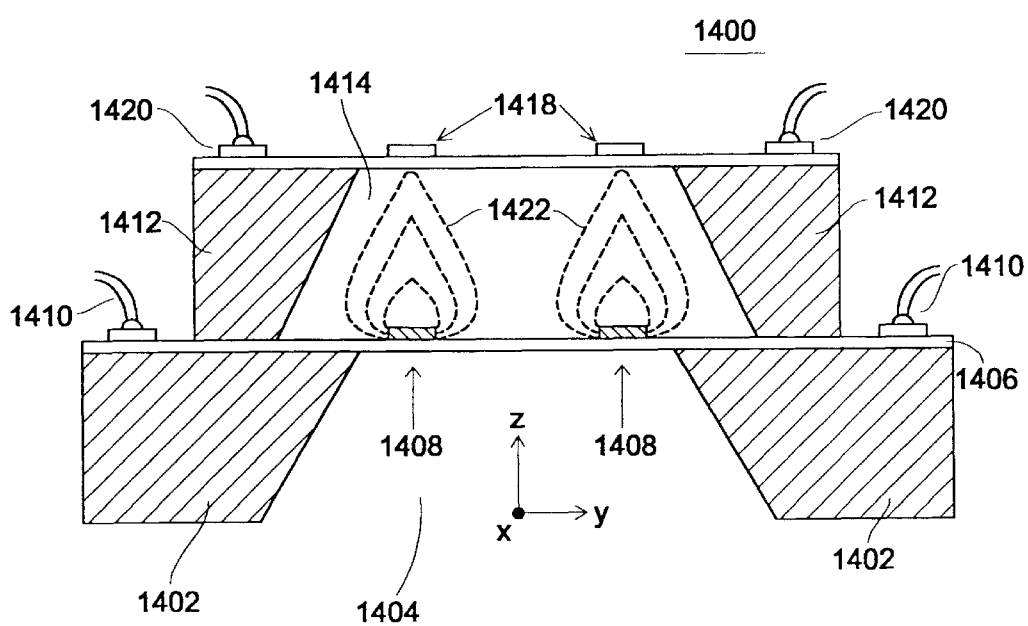
FIG. 14 shows a sixth embodiment of a sensor according to the present invention.

FIG. 14 shows a sixth embodiment of a sensor according to the present invention. A sensor 1400 is provided with a first substrate 1402 having an opening 1404 above which a diaphragm 1406 is preferably arranged. The diaphragm 1406 has provided thereon heating elements 1408 according to e.g. FIGS. 1, 3 and 5, which are arranged symmetrically with regard to an axis of rotation or Z axis. These heating elements 1408 are e.g. resistance heaters which are supplied with current via contact means 1410. Above the first substrate 1402, a second substrate 1412 is arranged centrally with respect to the axis of rotation; this second substrate 1412 is provided with an opening 1414 which is preferably closed by a diaphragm 1416. This diaphragm 1416 has provided thereon sensor elements 1418, which are arranged above the heating elements 1408 and symmetrically with regard to the axis of rotation; these sensor elements 1418 correspond e.g. to those of FIG. 1 etc. and are capable of detecting the isothermal fields of the heating elements 1408. The sensor elements, which may e.g. be resistors, are read and measured, respectively, via contact means 1420. When in operation, the heating elements 1408 generate candle-shaped isothermal fields 1422, which heat the sensor elements 1418. In the case of a rotational movement or an angular acceleration of the sensor 1400 about the axis of rotation or Z axis, e.g. the heated areas are moved relative to the sensor elements 1418 and the heating elements 1408, whereby the sensor elements 1418 will cool down and thus detect the rotational movement e.g. due to a change in resistance. This kind of arrangement is, however, not as sensitive as arrangements in which the sensor elements and the heating elements are arranged side by side.

As has already been mentioned, the sensors according to the present invention are preferably arranged in a closed, fluid-filled housing or in a capsule. In order to permit a high sensitivity of the sensor, the fluid is preferably a high-molecular gas or a gas of high density or a liquid. The density of the fluid influences the isothermal fields and the highest heating effect of the fluid will be obtained in the case of the highest density of the fluid.

The present invention comprises sensors which permit a simple detection of rotational movements and angular accelerations, which have a simple structural design and which are easy to produce. These sensors can preferably be used for the purpose of navigation, e.g. the navigation of automobiles, watercraft and aircraft, for detecting movements in liquids and fluids in closed systems, for detecting the rotation of shafts etc.

It is to be understood that various alterations, modifications and/or additions which may occur to those skilled in the art may be made to the features of possible and preferred embodiments of the invention as herein described without departing form the spirit and scope of the invention as defined in the claims.

What is claimed is:

1. A sensor for detecting a rotational movement, an angular acceleration, a tilt or an acceleration, comprising:
   at least one heating element which is arranged in a first plane extending at right angles to an axis, the heating element being adapted to produce in a fluid surrounding the heating element a convection flow zone through which an isothermal field is defined; and
   at least one sensor element, the fluid surrounding the sensor element, and the sensor element being adapted to be displaced relative to the isothermal field when a rotational movement or an angular acceleration takes place;
   wherein the heating element extends in the form of a circular arc or in the form of an interrupted polygonal progression around the axis.

2. A sensor according to claim 1, wherein the heating element as well as the sensor element are arranged in the first plane.

3. A sensor according to claim 1, wherein the heating element and the sensor element are arranged on a substrate.

4. A sensor according to claim 3, wherein the heating element and the sensor element are arranged in a cantilevered mode of arrangement above an opening in the substrate.

5. A sensor according to claim 3, wherein the substrate is provided with a diaphragm.

6. A sensor according to claim 1, wherein first and second sensor elements are respectively arranged on a first and a second side of the heating element when seen in the direction of rotation.

7. A sensor according to claim 6, wherein the heating element is a resistor with a temperature-dependent resistance value.

8. A sensor according to claim 6, wherein the heating element comprises a first series connection of thermoelements having a first end, which is connected to a first external connection, and a second end, which is connected to a centre connection, and a second series connection of thermoelements having a first end, which is connected to a second external connection, and a second end, which is connected to the centre connection, the second series connection being switched opposite to the first series connection.

9. A sensor according to claim 8 comprising in addition the following features:

means for applying a symmetric alternating voltage between the first and second external connections;

means for measuring a direct voltage at the center connection; and means for controlling the alternating voltage in dependence upon the measured direct voltage.

10. A sensor according to claim 1, wherein four heating elements are arranged around the axis of rotation such that they are displaced by 90° relative to one another.

11. A sensor according to claim 10, wherein two respective sensor elements are arranged adjacent to the heating element on a first and on a second side of the heating element, when seen in the direction of rotation.

12. A sensor according to claim 1, wherein the at least one sensor element consists of a series connection of thermoelements and/or of a measuring resistor.

13. A sensor according to claim 11, wherein the sensor is arranged in such a way that the rotational movement or angular acceleration to be detected is determined from the difference between a sum of the measuring signals of the individual sensor elements on the first side of a respective heating element and a sum of the measuring signals of the individual sensor elements on the second side of a respective heating element.

14. A sensor according to claim 11, wherein the sensor is arranged such that a tilt of the sensor about a first tilt axis, which extends at right angles to the axis of rotation, is determined from the difference between a sum of the measuring signals of sensor elements on the first and on the second side of a first heating element and a sum of the measuring signals of sensor elements on the first and on the second side of a second heating element, the second heating element being displaced by 180° relative to the first heating element.

15. A sensor according to claim 14, wherein the sensor is arranged such that a tilt of the sensor about a second tilt axis, which extends at right angles to the axis of rotation and the first tilt axis, is determined from the difference between a sum of the measuring signals of sensor elements on the first and on the second side of a third heating element and a sum of the measuring signals of sensor elements on the first and on the second side of a fourth heating element, the fourth heating element being displaced by 180° relative to the third heating element.

16. A sensor according to claim 6, wherein the first and second sensor elements are conducting tracks having the shape of a quarter of a circle.

17. A sensor according to claim 1, wherein the sensor element is arranged in a second plane, which is parallel to the first plane, above the heating element.

18. A sensor according to claim 1, wherein the sensor is either arranged such that it is adapted to detect the rotational movement or the angular acceleration of the sensor, or arranged such that it is adapted to detect the rotational movement or the angular acceleration of the fluid.

* * * * *